(12) United States Patent
Grady et al.

(10) Patent No.: US 7,382,353 B2
(45) Date of Patent: Jun. 3, 2008

(54) CHANGING A FUNCTION OF A DEVICE BASED ON TILT OF THE DEVICE FOR LONGER THAN A TIME PERIOD

(75) Inventors: Philip E. Grady, Kannapolis, NC (US); Paul Andrew Hakenewerth, Charlotte, NC (US); Kursad Urungu Oney, Durham, NC (US); Kevin Laverne Schultz, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 528 days.

(21) Appl. No.: 10/992,437

(22) Filed: Nov. 18, 2004

(65) Prior Publication Data

US 2006/0103733 A1 May 18, 2006

(51) Int. Cl.
G09G 5/00 (2006.01)

(52) U.S. Cl. .............. 345/156; 345/168; 345/169; 345/173; 345/176

(58) Field of Classification Search ........ 345/156–173, 345/7, 204, 89, 417, 418, 427, 428, 473, 345/649; 455/575.7, 456.1, 423; 348/700; 349/117; 369/44.32; 342/196, 163; 340/540; 200/61.49
See application file for complete search history.

(56) References Cited

U.S. PATENT DOCUMENTS

| | | | | |
|---|---|---|---|---|
| 4,918,262 A | * | 4/1990 | Flowers et al. ............. | 345/173 |
| 5,552,912 A | * | 9/1996 | Sharp et al. ................. | 349/117 |
| 6,078,281 A | * | 6/2000 | Milkovich et al. .......... | 342/196 |
| 6,307,550 B1 | * | 10/2001 | Chen et al. .................. | 345/418 |
| 6,845,067 B2 | * | 1/2005 | Ohtsu ....................... | 369/44.32 |
| 6,965,379 B2 | * | 11/2005 | Lee et al. .................... | 345/427 |
| 7,019,694 B2 | * | 3/2006 | Krumm et al. ............. | 342/463 |
| 7,138,979 B2 | * | 11/2006 | Robin et al. ................ | 345/158 |
| 7,145,454 B2 | * | 12/2006 | Linjama et al. ............. | 340/540 |
| 7,158,154 B2 | * | 1/2007 | Kim et al. ................... | 345/649 |
| 7,184,025 B2 | * | 2/2007 | Williams et al. ............ | 345/169 |
| 7,187,364 B2 | * | 3/2007 | Duarte et al. ............... | 345/168 |
| 7,307,228 B2 | * | 12/2007 | Wehrenberg ............. | 200/61.49 |
| 2002/0036717 A1 | * | 3/2002 | Abiko et al. ................ | 348/700 |
| 2003/0085870 A1 | * | 5/2003 | Hinckley ................... | 345/156 |
| 2004/0263479 A1 | * | 12/2004 | Shkolnikov ................ | 345/169 |
| 2005/0101314 A1 | * | 5/2005 | Levi ........................... | 455/423 |

* cited by examiner

Primary Examiner—Prabodh Dharia
(74) Attorney, Agent, or Firm—Owen J. Gamon

(57) ABSTRACT

In various embodiments, changing the function involves disabling an input device, disabling an output device, changing a display mode of the output device from portrait to landscape, or increasing volume of the output device. In an embodiment, the change of the function is delayed by a time period, and the delay for changing the output device is longer than the delay for changing the input device. If the electronic device is upright, the input device and the output device are enabled. The tilt is sensed by a sensing device, signals from the sensing device are filtered, and a delay is introduced. In this way, premature disabling or enabling of the electronic device is avoided.

6 Claims, 6 Drawing Sheets

US 7,382,353 B2

CHANGING A FUNCTION OF A DEVICE BASED ON TILT OF THE DEVICE FOR LONGER THAN A TIME PERIOD

FIELD

An embodiment of the invention generally relates to computing devices. In particular, an embodiment of the invention generally relates to a changing a function of an electronic device based on a tilt of the device.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated and complex computer software has evolved to take advantage of the higher performance of the hardware, resulting in computer systems today that are much more powerful and much smaller than just a few years ago.

As computers have become smaller, using them in a variety of portable or handheld electronic devices has become not only possible, but commonplace. These portable electronic devices may include laptop or notebook computers, telephones, GPS (Global Positioning Systems) devices, PDAs (Personal Digital Assistants), and pagers, among others. Since these electronic devices are portable and easily moved, they are frequently tilted, either intentionally or accidentally, as the user moves them about and are also easily bumped, which may cause unintended selection of keys, buttons, touchscreens, or other input devices. For example, when a portable electronic device, such as a cell phone, is left powered on and placed in a purse, handbag, or briefcase, a preprogrammed button may be bumped and accidentally place a call.

In an attempt to address these problems, electronic devices may have tilt sensors attached that detect when the device is tilted and, in response, turn off the electronic device and turn it back on when the device is once again oriented properly. Unfortunately, these tilt sensors cannot distinguish between the force of acceleration due to movement and the force due to the earth's gravity. Since portable devices are often used when moving, tilt sensors can frequently report that the device is tilted when it is fact upright, or that it is upright when it is in fact tilted. This can cause the functions of the electronic device to be disabled prematurely or re-enabled prematurely.

Thus, without a better way to handle the tilting of electronic devices, users will continue to suffer from accidental input and inconvenience.

SUMMARY

A method, apparatus, system, and signal-bearing medium are provided that, in an embodiment, change a function of an electronic device in response to a tilt of the electronic device. In various embodiments, changing the function involves disabling an input device, disabling an output device, changing a display mode of the output device from portrait to landscape, or increasing volume of the output device. In an embodiment, the change of the function is delayed by a time period, and the delay for changing the output device is longer than the delay for changing the input device. If the electronic device is upright, the input device and the output device are enabled. The tilt is sensed by a sensing device, signals from the sensing device are filtered, and a delay is introduced. In this way, premature disabling or enabling of the electronic device is avoided.

DETAILED DESCRIPTION

Figure 1:
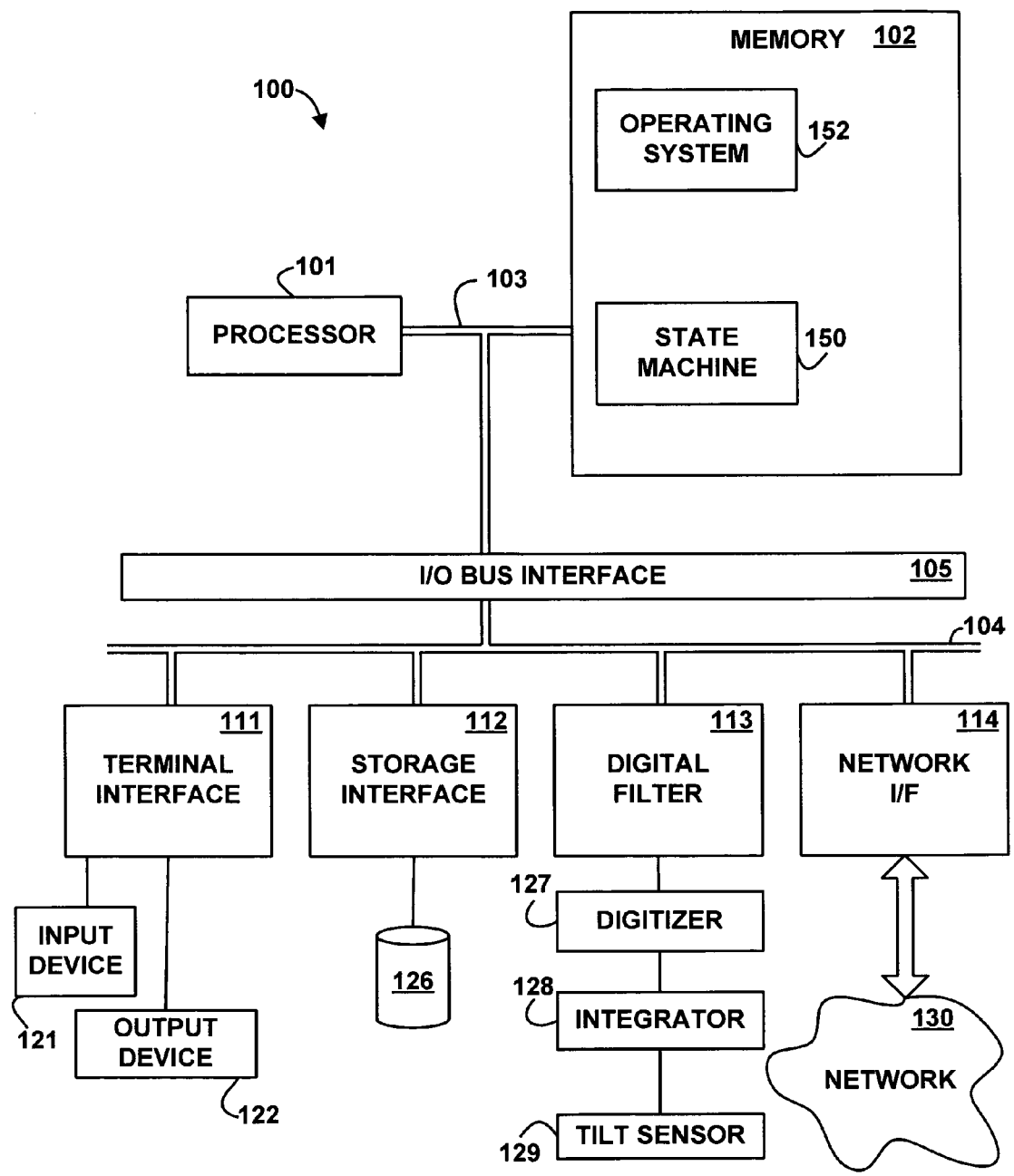
FIG. 1 depicts a block diagram of an example system for implementing an embodiment of the invention.

Referring to the Drawing, wherein like numbers denote like parts throughout the several views, FIG. 1 depicts a high-level block diagram representation of an electronic device 100 connected to a network 130, according to an embodiment of the present invention. The major components of the electronic device 100 include one or more processors 101, a main memory 102, a terminal interface 111, a storage interface 112, a digital filter 113, and communications/network interfaces 114, all of which are coupled for inter-component communication via a memory bus 103, an I/O bus 104, and an I/O bus interface unit 105.

The electronic device 100 contains one or more general-purpose programmable central processing units (CPUs) or processors 101. In an embodiment, the electronic device 100 contains multiple processors; however, in another embodiment the electronic device 100 may alternatively be a single CPU system. Each processor 101 executes instructions stored in the main memory 102 and may include one or more levels of on-board cache.

The main memory 102 is a random-access semiconductor memory for storing data and programs. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 102 includes a state machine 150 and an operating system 152. Although the state machine 150 and the operating system 152 are illustrated as being contained within the memory 102 in the electronic device 100, in other embodiments some or both of them may be on different computer systems and may be accessed remotely, e.g., via the network 130. The electronic device 100 may use virtual addressing mechanisms that allow the programs of the electronic device 100 to behave as if they only have access to a large, single storage entity instead of access to multiple, smaller storage entities. Thus, while the state machine 150 and the operating system 152 are both illustrated as being contained within the main memory 102, these elements are not necessarily all completely contained in the same storage device at the same time. Further, although the state machine 150 and the operating system 152 are illustrated as being separate entities, in other embodiments they may be packaged together.

The state machine 150 interprets input from the digital filter 113 and, in response, enables or disables the input device 121 and/or the output device 122. In an embodiment, the state machine 150 includes instructions capable of executing on the processor 101 or statements capable of being interpreted by instructions executing on the processor 101 to perform the functions as further described below with reference to FIG. 5. In another embodiment, the state machine 150 may be implemented in microcode. In another embodiment, the state machine 150 may be implemented in hardware via logic gates and/or other appropriate hardware techniques. Example states and transitions of the state machine 150 are further described below with reference to FIG. 6.

The operating system 152 is software that controls the allocation and usage of hardware resources of the electronic device 100 among various applications, processes, or threads, such as processing time of the processor 101, the memory 102, disk space, and peripheral devices. The operating system 152 is typically the foundation on which applications are built, such as the state machine 150. In various embodiments, the operating system 152 may be implemented by WIN CE.NET, OS/400, UNIX, AIX, or any other appropriate operating system. The operating system 152 includes instructions capable of executing on the processor 101 or statements capable of being interpreted by instructions that execute on the processor 101.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, through the system I/O bus 104. The system I/O bus 104 may be, e.g., an industry standard PCI bus, or any other appropriate bus technology.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, etc. Furthermore, while the I/O bus interface 105 and the I/O bus 104 are shown as single respective units, the electronic device 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The I/O interface units support communication with a variety of storage and I/O devices. For example, the terminal interface unit 111 supports the attachment of one or more input devices 121 (e.g. a keyboard, mouse, buttons, keypad, microphone, trackpad, touchscreen, or any other input device) and output devices 122 (e.g., a screen, display, printer, speaker, or any other output device). Although the input devices 121 and output devices 122 are illustrated as being separate, in another embodiment, some or all of their functions may be combined.

The storage interface unit 112 supports the attachment of one or more storage devices 126, e.g., solid state storage (such as ATA Flash storage), direct access storage devices (DASD) (which are typically rotating magnetic disk drive storage devices, although they could alternatively be other devices, including arrays of disk drives configured to appear as a single large storage device to a host), or any other appropriate type of storage device. The contents of the main memory 102 may be stored to and retrieved from the direct access storage devices 126.

The tilt sensor 129 detects a tilt in the electronic device 100 by generating an artificial horizon and measuring angular tilt with respect to that horizon. The tilt sensor 129 may have any appropriate tilt angle range and number of axes. In various embodiments, the tilt sensor 129 may be implemented via an accelerometer, a capacitive tilt sensor, an electrolytic tilt sensor, a gas bubble tilt sensor, a mercury tilt sensor, a pendulum tilt sensor, a mechanical tilt sensor, or any other appropriate type of tilt sensor. In various embodiments, the tilt sensor 129 may be implemented via a sensor element, chip, sensor, transducer, instrument, meter, gauge, indicator, recorder, totalizer, or any other type of device technology. The tilt sensor 129 is also known as an inclinometer.

The integrator 128 receives signals from the tilt sensor 129 and filters out small motions using averaging and signal hysteresis of the signals. The digitizer 127 performs digitizing and the hysteresis of the signals and is further described below with reference to FIG. 4. The integrator 128 is further described below with reference to FIGS. 2 and 4. The digital filter 113 provides or introduces delays in the signals from the integrator 128 to provide for precise control. The digital filter 113 is further described below with reference to FIGS. 2 and 4.

The network interface 114 provides one or more communications paths from the electronic device 100 to other digital devices and computer systems; such paths may include, e.g., one or more networks 130.

The electronic device 100 may be a single-user or a multi-user system. In other embodiments, the electronic device 100 may be implemented as a personal computer, portable computer, laptop or notebook computer, PDA (Personal Digital Assistant), tablet computer, pocket computer, telephone, pager, GPS (Global Positioning System), navigation system, appliance, or any other appropriate type of electronic device.

The network 130 may be any suitable network or combination of networks and may support any appropriate protocol suitable for communication of data and/or code to/from the electronic device 100. In various embodiments, the network 130 may represent a storage device or a combination of storage devices, either connected directly or indirectly to the electronic device 100. In an embodiment, the network 130 may support Infiniband. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol). In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number (including zero) of networks (of the same or different types) may be present.

It should be understood that FIG. 1 is intended to depict the representative major components of the electronic device 100 and the network 130 at a high level, that individual components may have greater complexity that represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the electronic device 100, and that, when read and executed by one or more processors 101 in the electronic device 100, cause the electronic device 100 to perform the steps necessary to execute steps or elements comprising the various aspects of an embodiment of the invention.

Moreover, while embodiments of the invention have and hereinafter will be described in the context of fully functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the electronic device 100 via a variety of signal-bearing media, which include, but are not limited to:

(1) information permanently stored on a non-rewriteable storage medium, e.g., a read-only memory device attached to or within a computer system, such as a CD-ROM, DVD-R, or DVD+R;

(2) alterable information stored on a rewriteable storage medium, e.g., a hard disk drive (e.g., the DASD 125, 126, or 127), CD-RW, DVD-RW, DVD+RW, DVD-RAM, or diskette; or (3) information conveyed by a communications medium, such as through a computer or a telephone network, e.g., the network 130, including wireless communications.

Such signal-bearing media, when carrying machine-readable instructions that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying software systems and web services that implement, some or all of the methods described herein. Aspects of these embodiments may also include analyzing the client company, creating recommendations responsive to the analysis, generating software to implement portions of the recommendations, integrating the software into existing processes and infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
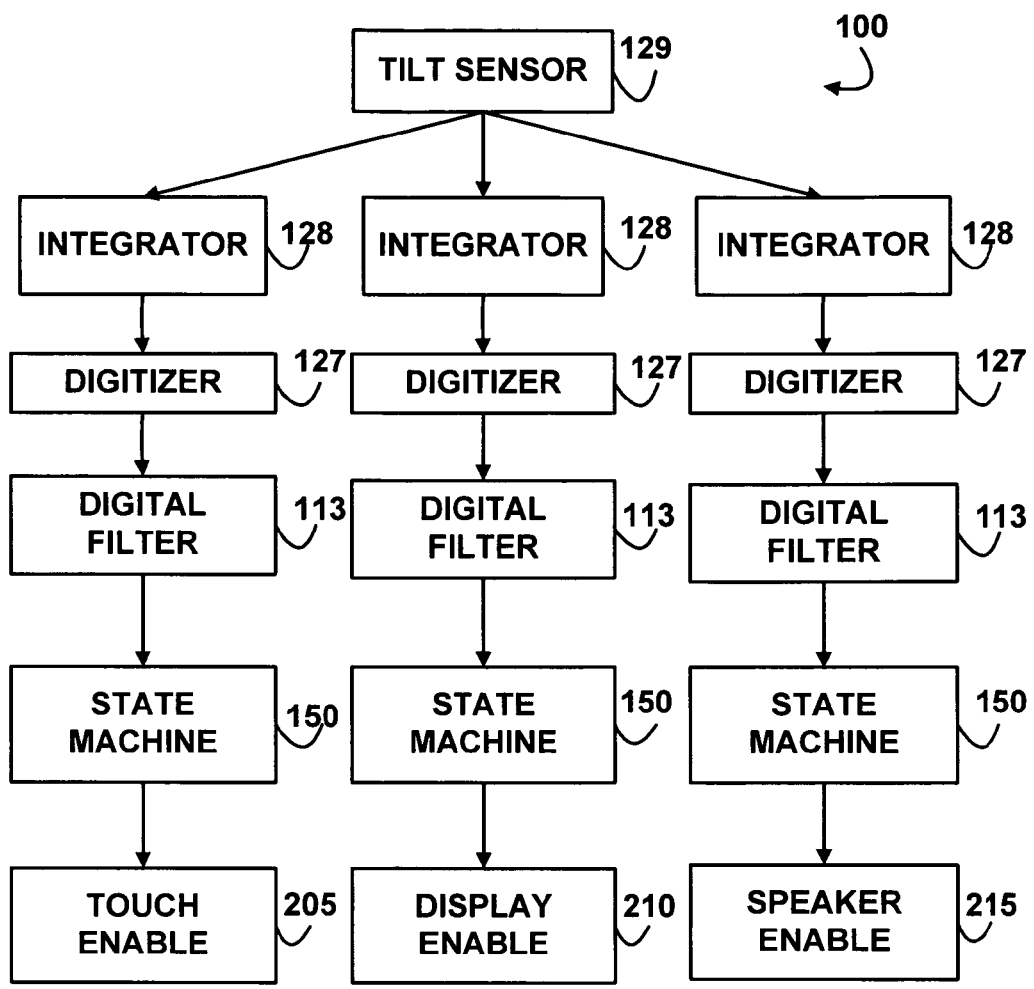
FIG. 2 depicts a block diagram of selected components of the example system, according to an embodiment of the invention.

FIG. 2 depicts a block diagram of selected components of the example electronic device 100, according to an embodiment of the invention. Illustrated are the tilt sensor 129, which sends its output signals to the multiple integrators 128, which in turn send their output signals to the digitizers 127, which in turn sends their output signals to the digital filters 113, which in turn send their output signals to the state machines 150. The tilt sensor 129 detects a tilt of the electronic device 100. The integrators 128 filter out small tilt motions using averaging of the signals from the tilt sensor 129 and signal hysteresis of the signals from the tilt sensor 129 to prevent signal bounce during transition periods. The digitizers 127 perform digitizing and the hysteresis of the signals. The digital filters 113 provide delays in the signals to allow for precise control. The state machines 150 change various functions 205, 210, and 215 of the electronic device 100 in response to the signals from the digital filters 113. Any number of tilt sensors 129, integrators 128, digital filters 113, and state machines 150 may be present. Further, the state machines 150 may change any type of functions of the electronic device 100, which are not restricted to the functions 205, 210, and 215 illustrated. For example, changing the functions of the electronic device 100 in response to signals from the digital filters 113 may include, but are not limited to: enabling the input device 121 or the output device 122, disabling the input device 121 or the output device 122, changing sensitivity of the input device 121 (e.g., a touchscreen sensitivity, microphone sensitivity, or mouse sensitivity), increasing or decreasing the volume of a speaker (including a headset), changing a display device between portrait and landscape mode, changing the brightness of the display device, changing the speed of the processor 101, or changing the electronic device 100 between a power saving or standby mode and a normal operating mode.

Figure 3:
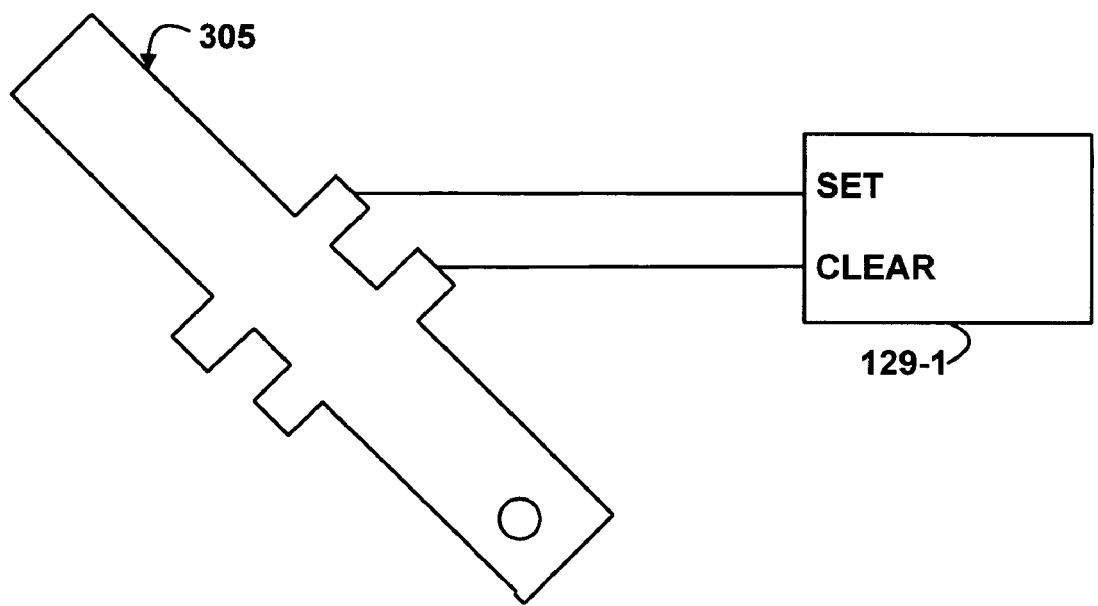
FIG. 3 depicts a block diagram of an example tilt sensor and mechanical integrator, according to an embodiment of the invention.

FIG. 3 depicts a block diagram of a mechanical tilt sensor 129-1 (an example of the tilt sensor 129 from FIG. 1), according to an embodiment of the invention. The inertial object 305 travels a distance before triggering the tilt sensor 129-1. The distance traveled by the inertial object 305 masks the effects of small motions, which acts as the integrator 128.

Figure 4:
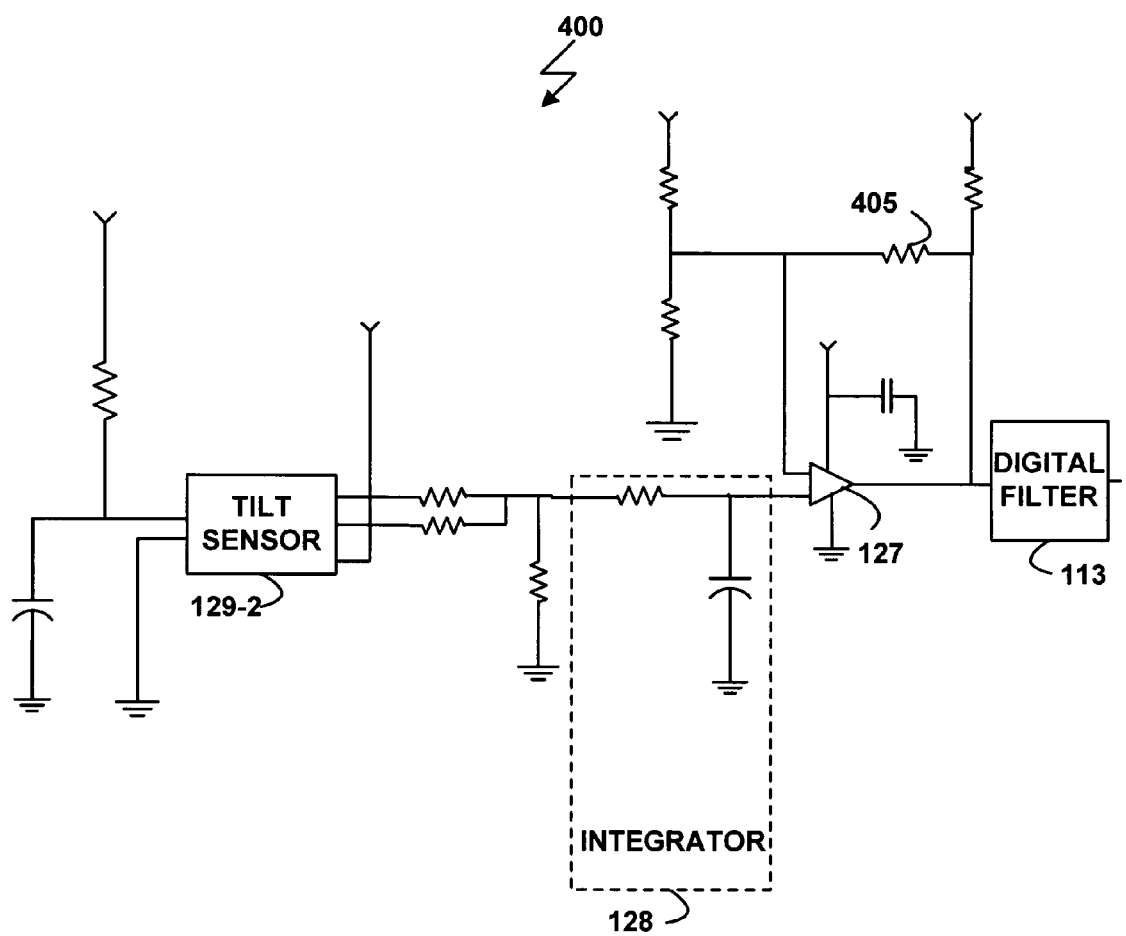
FIG. 4 depicts a circuit diagram of an example tilt sensor, electrical integrator, and digitizer with hysteresis, according to an embodiment of the invention.

FIG. 4 depicts a circuit diagram 400 of an example tilt sensor 129-2 (an example of the tilt sensor 129 from FIG. 1), an electrical integrator 128, a digital filter 113, a digitizer 127, and a hysteresis resistor 405, according to an embodiment of the invention.

The integrator 128 is shown implemented as a resistor and a capacitor, but in other embodiments any appropriate circuits for the integrator 128 may be used. The integrator 128 performs averaging and the digitizer 127 performs digitizing and the hysteresis of the signals from the tilt sensor 129-2. The hysteresis resistor 405 eliminates signal bounce during transition periods, but in other embodiments any appropriate component may be used. The digitizer 127 is illustrated as implemented by a comparator, but in other embodiments any appropriate circuits may be used.

The digital filter 133 provides a delay before the state machine 150 is allowed to enable or disable functions of the electronic device 100. Thus, the digital filter 113 allows control of how tilt is perceived by the user by selecting the speed at which each function is enabled or disabled and limits the number of nuisance state changes due to normal operator movement. In an embodiment, the operator adjusts the delay of the digital filter 113, in order to better meet the needs of the operator. In an embodiment, the implementation of the digital filter 113 is implemented via a counter started when a change of state in the output of the tilt sensor 129-2 is detected. If the counter reaches a programmable count, then the output of the digital filter 113 changes state. But, if the output from the tilt sensor 129-2 goes back to its original state prior to the counter reaching its count, then the counter is reset to zero, and the output of the digital filter 113 does not change state. In an embodiment, the digital filter 113 is implemented via the front end of the GPIO block inside the AMD CS5535 Southbridge chip, but in other embodiments any appropriate elements may be used.

Figure 5:
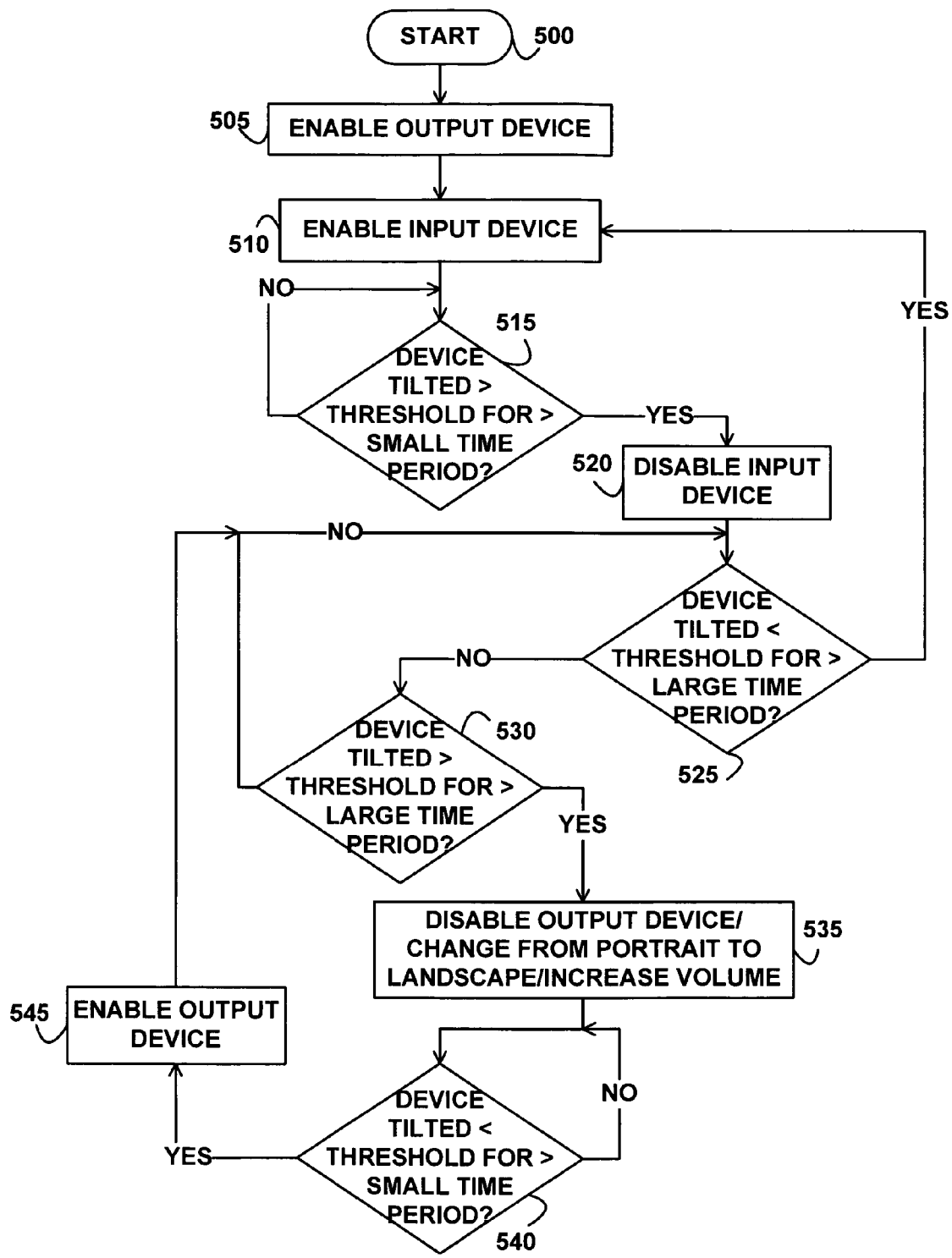
FIG. 5 depicts a flowchart of example processing for the system, according to an embodiment of the invention.

FIG. 5 depicts a flowchart of example processing for the system, according to an embodiment of the invention. Control begins at block 500. Control then continues to block 505 where the state machine 150 enables the output device 122. Control then continues to block 510 where the state machine 150 enables the input device 121.

Control then continues to block 515 where the state machine 150 determines whether the electronic device 100 is tilted greater than a tilt threshold for longer than a small time period. The state machine 150 makes the determination at block 515 by analyzing output from the digital filter 113.

If the determination at block 515 is true, then the electronic device 100 is tilted greater than a tilt threshold for longer than a small time period, so control continues to block 520 where the state machine 150 disables the input device 121. Disabling the input device 121 after only a small time period avoids accidental input, e.g., accidental pressing of buttons due to the electronic device 100 bouncing against the user's leg while the user walks, or accidental pressing of buttons due to the electronic device 100 bouncing against objects in the user's briefcase.

Control then continues to block 525 where the state machine 150 determines whether the electronic device 150 is tilted less than a tilt threshold for longer than a large time period. The state machine 150 makes the determination at block 525 by analyzing output from the digital filter 113. If the determination at block 525 is true, then the electronic device 150 is tilted less than a tilt threshold for longer than a large time period, and the electronic device 100 is considered to be upright, so control returns to block 510, as previously described above.

If the determination at block 525 is false, then the electronic device 150 is not tilted less than a tilt threshold for longer than a large time period, so control continues to block 530 where the state machine 150 determines whether the electronic device 100 is tilted greater than the tilt threshold for longer than a large time period. The state machine 150 makes the determination at block 530 by analyzing output from the digital filter 113.

If the determination at block 530 is true, then the electronic device 100 is tilted greater than a tilt threshold for longer than a large time period, so control continues to block 535 where the state machine 150 disables the output device 122, changes the display of the output device 122 from portrait to landscape orientation, or increases the volume of the output device 122 (e.g., a speaker). The large time period is longer than the small time period. The large time period is used because the tilt sensors 129 might trip prematurely, and waiting for the large time period before disabling the output device 122 avoids turning off the output device 122 prematurely. For example, if the user is walking while holding the electronic device 100, the tilt sensor 129 is continually being jostled, which may cause it to alternate between signaling that it is tilted more than the tilt threshold and signaling that it is tilted less than the tilt threshold. By waiting for the large time period before disabling the output device 122, embodiments of the invention avoid the problem of, for example, the display blinking on and off in an annoying fashion.

Control then continues to block 540 where the state machine 150 determines whether the electronic device 100 is tilted less than the tilt threshold for longer than a small time period. The state machine 150 makes the determination at block 540 by analyzing output from the digital filter 113. If the determination at block 540 is true, then the electronic device 100 is tilted less than the tilt threshold for longer than a small time period, so control continues to block 545 where the state machine 150 enables the output device 122. Control then returns to block 525, as previously described above.

If the determination at block 540 is false, then the electronic device 100 is not tilted less than the tilt threshold for longer than the small time period, so control returns to block 540, as previously described above.

If the determination at block 530 is false, then the electronic device 100 is not tilted greater than the tilt threshold for longer than the large time period, so control returns to block 525, as previously described above.

If the determination at block 515 is false, then the electronic device 100 is not tilted greater than the tilt threshold for longer than the small time period, so control returns to block 515, as previously described above.

In this way, the state machine 150 changes a function of the input device 121 or the output device 122 of the electronic device 100 based on detecting tilt of the electronic device 100 that lasts longer than small or large time periods. But, the state machine 150 is not limited to changing the functions illustrated in FIG. 5; instead the state machine 150 may change any appropriate function of the electronic device 100 in response to detecting tilt. For example, changing functions may include: enabling the input device 121 or the output device 122, disabling the input device 121 or the output device 122, changing sensitivity of the input device 121 (e.g., a touchscreen sensitivity, microphone sensitivity, or mouse sensitivity), increasing or decreasing the volume of a speaker (including a headset), changing a display device between portrait and landscape mode, changing the brightness of the display device, changing the speed of the processor 101, changing the electronic device 100 between a power saving or standby mode and a normal operating mode, or changing any other appropriate function of the electronic device 100. Further, although only a small and a large time period are described in FIG. 5, in other embodiments each function that is changed may have its own respective time period, or groups of functions may share time periods, and the state machine 150 or multiple state machines 150 may control some or all of the functions independently from each other.

Figure 6:
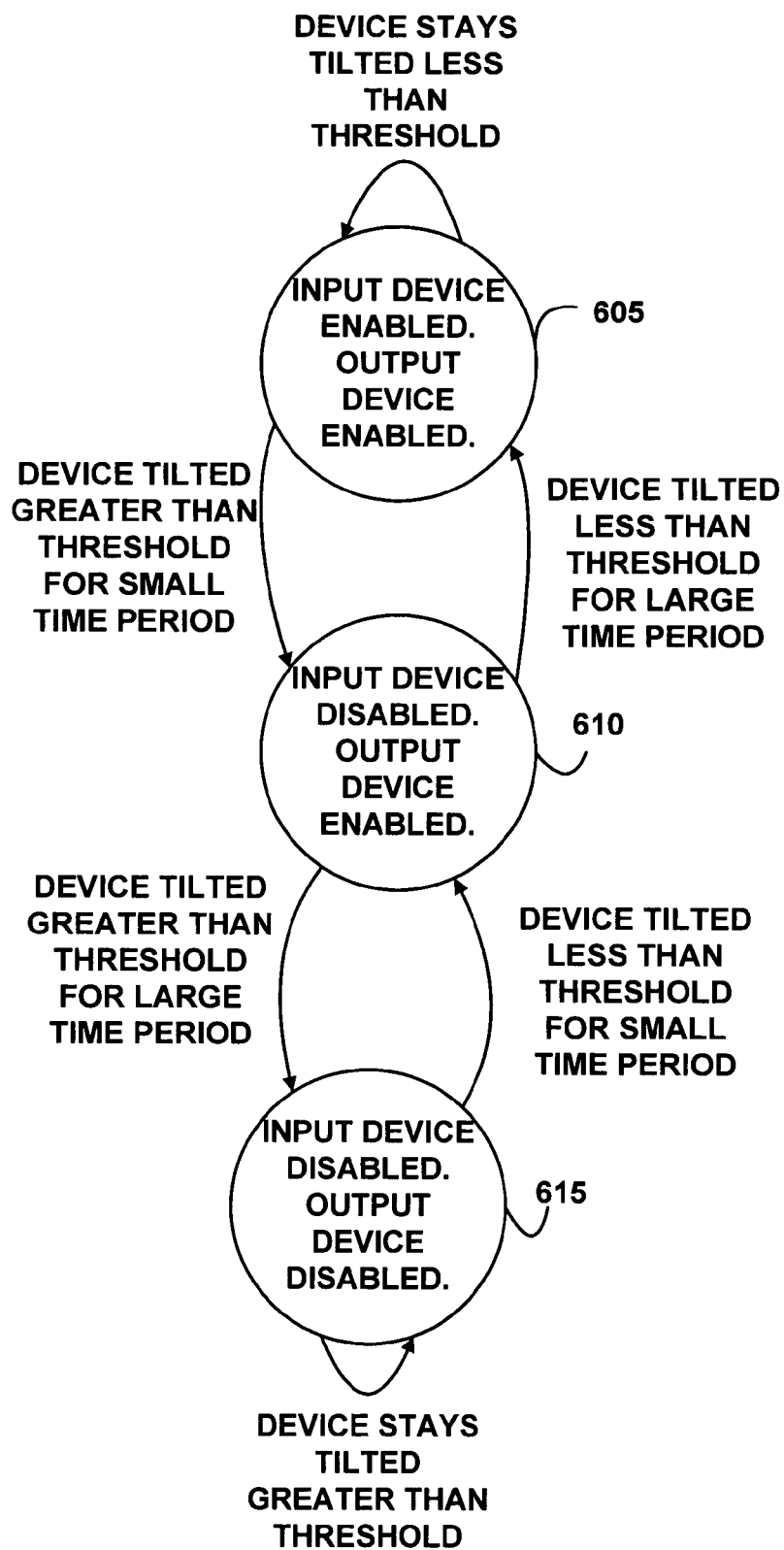
FIG. 6 depicts an example state diagram for a state machine, according to an embodiment of the invention.

FIG. 6 depicts an example state diagram for the state machine 150 (FIG. 1), according to an embodiment of the invention. The state machine 150 has states 605, 610, and 615, but in other embodiments any number of states may be present. At the state 605, the input device 121 is enabled and the output device 122 is enabled. At the state 610, the input device 121 is disabled and the output device 122 is enabled. At the state 615, the input device 121 is disabled and the output device 122 is disabled.

When the state machine 150 is in the state 605 and the electronic device 100 stays tilted less than a threshold, the state machine 150 remains in the state 605. When the state machine 150 is in the state 605 and the electronic device 100 is tilted greater than a threshold for a small time period, the state machine 150 moves from the state 605 to the state 610.

When the state machine 150 is in the state 610 and the electronic device 100 is tilted less than a threshold for a large time period, the state machine 150 moves from the state 610 to the state 605. When the state machine 150 is in the state 610 and the electronic device 100 is tilted greater than a threshold for a large time period, the state machine 150 moves from the state 610 to the state 615.

When the state machine 150 is in the state 615 and the electronic device 100 stays tilted greater than a threshold, the state machine 150 remains in the state 615. When the state machine 150 is in the state 615 and the electronic device 100 is tilted less than a threshold for a small time period, the state machine 150 moves from the state 615 to the state 610.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. A method comprising:
    determining whether an electronic device has tilted greater than a threshold for longer than a first time period;
    deciding whether the electronic device has tilted greater than the threshold for longer than a second time period, wherein the second time period is longer than the first time period;
    changing a function of an output device if the deciding is true; and
    changing a function of an input device if the determining is true.

2. The method of claim 1, wherein the changing the function of the input device further comprises:
    disabling the input device if the determining is true.

3. The method of claim 1, wherein the changing the function of the output device further comprises:
    disabling the output device if the deciding is true.

4. The method of claim 1, wherein the changing the function of the output device further comprises:
    changing the output device from portrait to landscape mode if the deciding is true.

5. The method of claim 2, further comprising:
    enabling the input device if the electronic device has tilted less than the threshold for longer than the second time period.

6. The method of claim 1, wherein the changing the function of the output device further comprises:
    changing brightness of a display device if the deciding is true.

* * * * *